United States Patent [19]
Yaotani

[11] Patent Number: 6,098,120
[45] Date of Patent: Aug. 1, 2000

[54] PERIPHERAL SHARING SYSTEM USING A BUS BRIDGE TO EMULATE PERIPHERALS ON A FIRST BUS TO A HOST ON A SECOND BUS

[75] Inventor: Takeshi Yaotani, Fukushima-ken, Japan

[73] Assignee: Alps Electric Co., Ltd., Toyko, Japan

[21] Appl. No.: 09/005,535

[22] Filed: Jan. 12, 1998

[30] Foreign Application Priority Data

Jan. 16, 1997 [JP] Japan .................................. 9-005872

[51] Int. Cl.⁷ .............................. G06F 3/00; G06F 15/16; G06F 9/455
[52] U.S. Cl. ................................ 710/16; 710/8; 709/227; 395/500.46
[58] Field of Search .......................... 709/227; 710/8–10, 710/15–16; 395/500.45, 500.46

[56] References Cited

U.S. PATENT DOCUMENTS

| | | | |
|---|---|---|---|
| 5,610,905 | 3/1997 | Murthy et al. | 370/401 |
| 5,784,581 | 7/1998 | Hannah | 710/110 |
| 5,832,492 | 11/1998 | Wooten | 707/107 |
| 5,890,015 | 3/1999 | Garney et al. | 710/62 |
| 5,933,611 | 8/1999 | Shakkarwar | 710/126 |
| 5,953,511 | 9/1999 | Sescila, III et al. | 710/129 |
| 5,974,486 | 10/1999 | Siddappa | 710/53 |
| 6,012,203 | 11/1998 | Sartore et al. | 710/8 |

OTHER PUBLICATIONS

Derfler, Jr., F., et al, "How Networks Work," Ziff–Davis Press, pp. 76–79, 1996.
"Anchor Chips Single–Chip EZ–Link (AN2720SC)," Anchor Chips, Inc., pp. 1–2, Nov. 1998.
"NET1080 USB TurboConnect Preliminary Specification," rev. 0.6, NetChip Technology, Inc., pp. 1 to 6–1, Jan. 2000.
"USB Info: Frequently Asked Questions," http://www.usb.org/faq/ans5.html, USB Implementers Forum, pp. 1–2, Aug. 1999.
"EZ–Link USB Cable," Anchor Chips, Inc., pp. 1–2, Nov. 1998.
"SE200 USB–USB Controller," http://www.aox.com/Text/SE200.htm, Aox Inc., pp. 1–3, Nov. 1998.

*Primary Examiner*—Ahmad F. Matar
*Assistant Examiner*—Andrew Caldwell
*Attorney, Agent, or Firm*—Brinks Hofer Gilson & Lione

[57] ABSTRACT

A dummy terminal connects two buses. Each bus has connected to it a host and at least one terminal. In a specific embodiment, the buses are implemented using the Universal Serial Bus (USB). Connected to each USB is one and only one host and at least one terminal. Examples of terminals include hard disk drives, floppy disk drives, keyboards, scanners, and printers. The dummy terminal functions as a bridge between the two buses and emulates a terminal of one bus system for a host computer of another bus system. The dummy terminal includes an interface unit for each bus system, data storage units to store transmission and received data for each host computer, and a communication control unit to control communication. The dummy terminal operates by initially responding to a line check signal from a first host computer. In response, the communication control unit transmits data "OK" to the first computer to indicate normal conditions. The first host computer then sends a terminal-identification recognition signal. The dummy terminal responds by transmitting terminal identification information representing a terminal on the other bus system to the first host computer. The first host computer then treats the dummy terminal as if it were the selected terminal on the other bus.

2 Claims, 2 Drawing Sheets

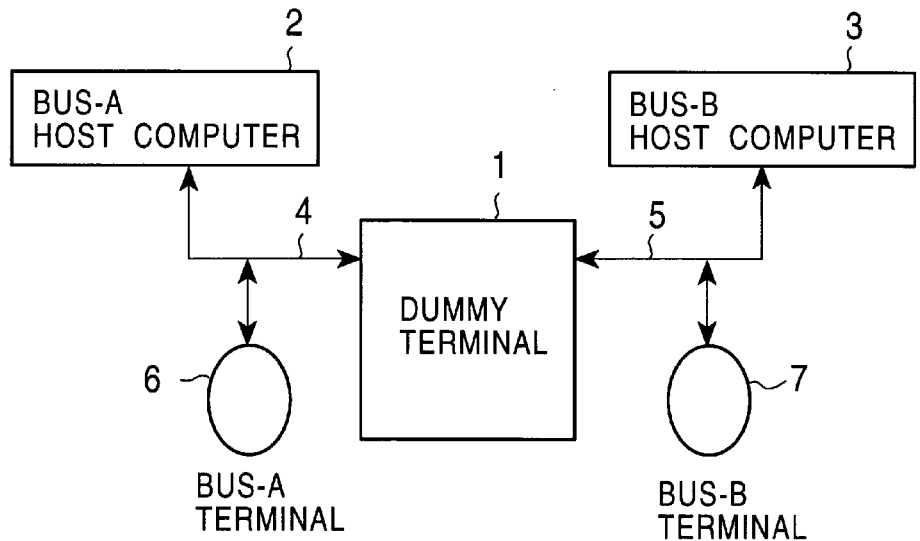
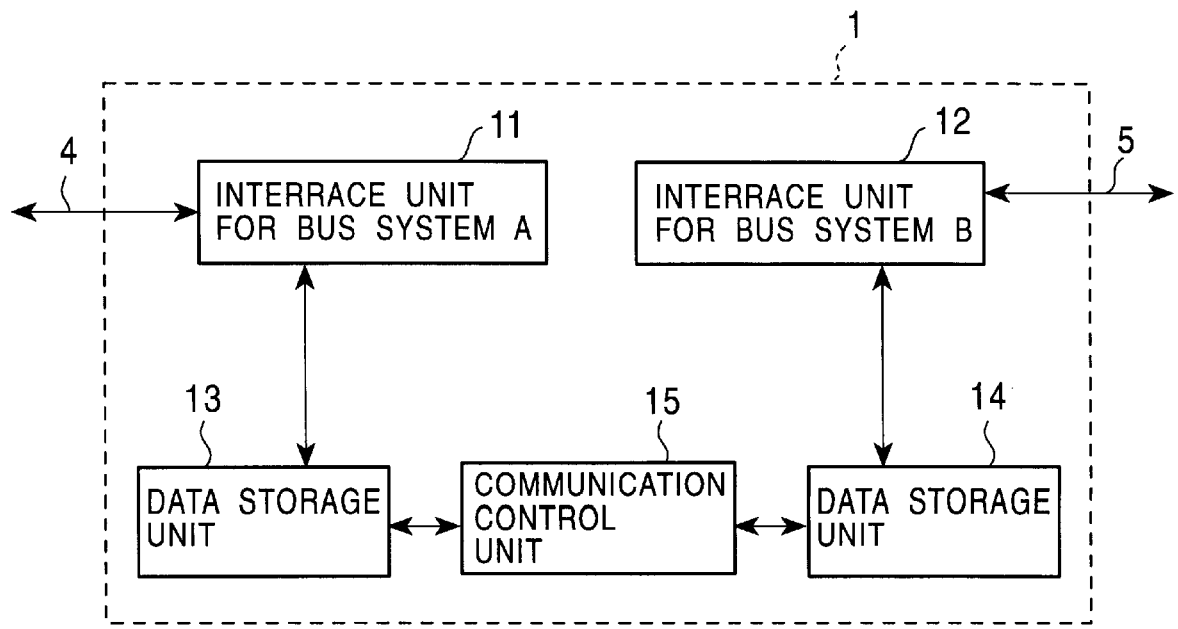

PERIPHERAL SHARING SYSTEM USING A BUS BRIDGE TO EMULATE PERIPHERALS ON A FIRST BUS TO A HOST ON A SECOND BUS

BACKGROUND OF THE INVENTION

1. Field of the Invention

The present invention relates to a dummy terminal system and a dummy terminal included therein in which a plurality of host computers are connected.

2. Description of the Related Art

In general, a method for communicating with a terminal, employed in a personal computer or the like, is a host control type. The host-control communication method is such that the setting of the communication between the host computer and the terminal is performed by the host computer so that the host computer and the terminal communicate with each other in accordance with the setting. The communication between the host computer and the terminal is controlled by a type of software called an operating system by means of, e.g., a universal serial bus as a bus system under control of the host computer.

The "terminal" means a device which is controlled in the host-control communication method by the host computer, such as a hard disc drive, a floppy disc drive, a keyboard, a printer or a scanner.

Since the host computer controls its bus system in the host control type, additional host computers cannot be connected to the bus system so that communication among a plurality of host computers is performed. Accordingly, regardless of whether the operating systems and communication methods of the host computers are identical or different, the host-control communication method has a problem in which communication among the plurality of host computers via one bus system cannot be performed.

In addition, the impossibility in mutually connecting the host computers causes a problem in which one terminal connected to the corresponding host computer cannot be used by one host computer not corresponding thereto.

SUMMARY OF THE INVENTION

Accordingly, it is an object of the present invention to provide a dummy terminal system including a dummy terminal in which (i) host computers having identical or different operating systems and host-control communication methods can be mutually connected, and (ii) a terminal connected to one host computer not corresponding thereto can be used.

To this end, according to an aspect of the present invention, the foregoing object has been achieved through provision of a dummy terminal system comprising: a first host computer having a first operating system and a first bus system; a second host computer having a second operating system and a second bus system; and a dummy terminal for connecting the first bus system and the second bus system, and controlling communication between the first and second bus systems.

According to another aspect of the present invention, the foregoing object has been achieved through provision of a dummy terminal system comprising: a first host computer having a first operating system and a first bus system; a second host computer having a second operating system and a second bus system; a dummy terminal for connecting the first bus system and the second bus system, and controlling communication between the first and second bus systems; and a terminal connected to at least either the first bus system or the second bus system.

According to a further aspect of the present invention, the foregoing object has been achieved through provision of a dummy terminal comprising: bus interface units for connecting a plurality of bus systems, and transmitting or receiving data; data storage units, corresponding to the respective bus interface units, for holding the data transmitted or received via the bus interface units; and a communication control unit for controlling communication by processing the data stored in each data storage unit, wherein the communication control unit performs the steps of: storing signal "OK" in one data storage unit when a line check signal is received in the one data storage unit, from which the line check signal is transmitted; obtaining terminal identification information about one terminal on one bus system connected to one different bus interface unit from one bus interface unit with the one data storage unit connected thereto by using the different bus interface unit when the one data storage unit receives and holds a terminal identification recognition signal before the communication control unit stores the obtained terminal identification information in the one data storage unit having received and held the terminal identification recognition signal, and converting the format of data communicated among the data storage units.

According to the present invention, by using a dummy terminal for connecting the bus systems of host computers and controlling communication, the host computers, which use the host-control communication method, can be connected regardless of whether the operating systems and communication methods of the host computers are identical or different.

In addition, by using a dummy terminal for connecting the bus systems of host computers and controlling communication, the dummy terminal operates as one terminal under control of one host computer not corresponding thereto. This enables control of one terminal under control of one host computer not corresponding thereto, which integrates various types of terminals.

In addition, by using a dummy terminal which connects the bus systems of host computers and which operates as a terminal under control of one host computer not corresponding thereto, the host computers, using the host-control communication method, can be mutually connected, which enables one host computer to control a terminal under control of one host computer not corresponding thereto.

BRIEF DESCRIPTION OF THE DRAWINGS

FIG. 1 is a block diagram showing a dummy terminal system according to an embodiment of the present invention.

FIG. 2 is a block diagram showing a dummy terminal in the terminal system shown in FIG. 1.

DESCRIPTION OF THE PREFERRED EMBODIMENT

Figure 3:
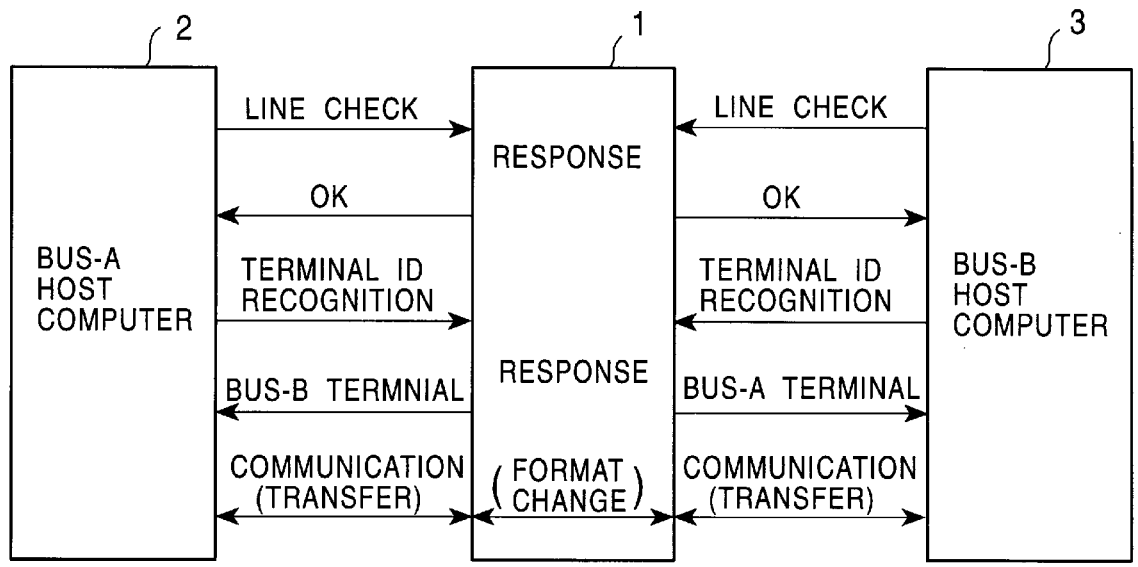
FIG. 3 is a block diagram showing the communication relationships of the dummy terminal shown in FIG. 2 with host computers.

A dummy terminal system and a dummy terminal, according to an embodiment of the present invention, will be described below with reference to the attached drawings.

FIG. 1 shows the structure of a dummy terminal system according to one embodiment of the present invention. The dummy terminal system includes a dummy terminal 1 to which a plurality of host computers (bus-A host computer 2 and bus-B host computer 3) using a host-control communication method, bus systems 4 and 5, and bus-A terminal 6 and bus-B terminal 7 respectively connected to the bus systems 4 and 5.

Here, the bus-A host computer 2 and the bus-B host computer 3 may have identical or different operating systems and communication methods. Similarly, the bus systems 4 and 5 may be identical or different. The bus-A terminal 6 and the bus-B terminal 7 are devices which are controlled in the host-control communication method by the bus-A host computer 2 and the bus-B host computer 3, such as hard disc drives, floppy disc drives, keyboards, printers, or scanners.

FIG. 2 shows a block diagram of the dummy terminal 1 shown in FIG. 1. As shown in FIG. 2, the dummy terminal 1 includes interface units 11 and 12 for bus systems A and B to which the bus systems 4 and 5 are connected, data storage units 13 and 14 in which data transmitted/received via the interface units 11 and 12 are stored, and a communication control unit 15 for controlling communication.

The operation of the dummy terminal 1 will be described below.

FIG. 3 shows the communication relationships of the dummy terminal 1 with the bus-A host computer 2 and the bus-B host computer 3.

At first, concerning the communication between the dummy terminal 1 and the bus-A host computer 2, the bus-A host computer 2 initially sends a line check signal to the dummy terminal 1 in order to check the bus system 4 for abnormal condition. This line check signal is stored in the data storage unit 13 via the bus system 4 and the interface unit 11 for bus system A. In response to this line check signal, the communication control unit 15 in the dummy terminal 1 stores signal "OK" in the data storage unit 13 in order to indicate that no abnormal condition exists in the bus system 4, even though the other bus system 5 is connected to the dummy terminal 1. The stored data is transmitted to the bus-A host computer 2 via the interface unit 11 for bus system A.

Next, the bus-A host computer 2 transmits a terminal-identification recognition (terminal ID recognition) signal to the dummy terminal 1 in order to recognize the terminal type and so forth. In response to the terminal ID recognition signal, the communication control unit 15 in the dummy terminal 1 recognizes that the bus-B terminal 7 exists on the bus system 5 separately from the bus system 4 controlled by the bus-A host computer 2. The communication control unit 15 responds with signal "terminal" as terminal identification information in order for the bus-A host computer 2 to recognize that the dummy terminal 1 seems as if it were the bus-B terminal 7. When receiving this terminal identification information, the bus-A host computer 2 recognizes that the dummy terminal 1 is the bus-B terminal 7, and performs the setting of items required for communication with the bus-B terminal 7, such as an identification number on the bus-B terminal 7 and communication timing. In accordance with the setting, for example, when the bus-B terminal 7 is a hard disc drive, the bus-A host computer 2 controls the dummy terminal 1 as a hard disc drive. When the bus-B terminal 7 is a printer, the bus-A host computer 2 controls the dummy terminal 1 as a printer.

In addition, when performing certain control of the bus-B terminal 7, the bus-A host computer 2 performs data communication with the dummy terminal 1. The data is sent to the bus-B terminal 7 via the bus system 4, the interface unit 11 for bus system A, the data storage unit 13, the communication control unit 15, the data storage unit 14, the interface unit 12 for bus system B, and the bus system 5. In the bus-B terminal 7, the communication control unit 15 in the dummy terminal 1 changes the communication format so that the communication between the two bus systems 4 and 5 is established.

For example, when the bus-A terminal 6 and the bus-B terminal 7 are hard disc drives, and part of data on the hard disc drive 6 (bus-A terminal) needs to be copied to the other hard disc drive 7 (bus-B terminal), the bus-A host computer 2 only performs control so that the data on the hard disc drive 6 (bus-A terminal) is copied via the bus system 4 to the dummy terminal 1 recognized as a hard disc drive. In response to this operation, the dummy terminal 1 uses the communication control unit 15 to transfer to the hard disc drive 7 (bus-B terminal) the data copied to the dummy terminal 1 from the hard disc drive 6 (bus-A terminal). This manner realizes data copying between the hard disc drives 6 and 7 (bus-A and bus-B terminals) connected to the different bus systems 4 and 5. Similarly, controlling the dummy terminal 1 as a hard disc drive also realizes the copying of data from the hard disc drive 7 (bus-B terminal) to the hard disc drive 6 (bus-A terminal).

In the same manner, the data copying between the dummy terminal 1 and the bus-B host computer 3 is also performed.

Figure 4:
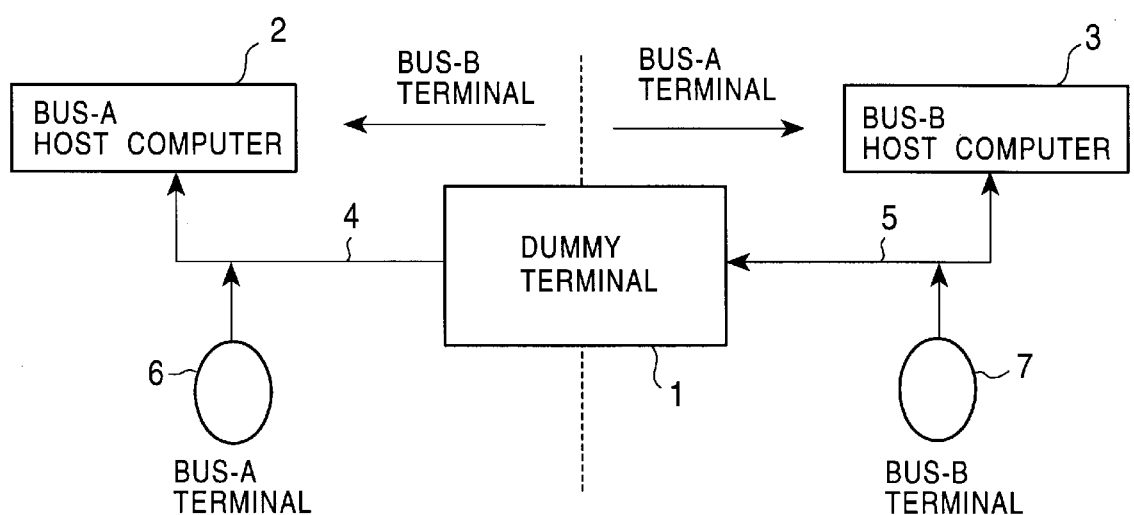
FIG. 4 is a block diagram showing the dummy terminal system shown in FIG. 1 in operation.

Accordingly, as shown in FIG. 4, the bus-A host computer 2 recognizes the dummy terminal 1 as the bus-B terminal 7, while the bus-B host computer 3 recognizes the dummy terminal 1 as the bus-A terminal 6. In other words, the dummy terminal 1 is recognized as a different terminal by each host computer.

As described above, the bus systems 4 and 5 are connected by using the dummy terminal 1, whereby the bus-A and bus-B host computers 2 and 3 can be mutually connected. Thus, one terminal controlled by either host computer can be used.

The embodiment has described one dummy terminal system in which two host computers 2 and 3 are connected to the dummy terminal 1. However, three or more host computers may be connected to the dummy terminal 1.

What is claimed is:

1. A dummy terminal system comprising:

a first host computer having a first operating system and a first bus system;

a second host computer having a second operating system and a second bus system;

a dummy terminal connecting said first bus system and said second bus system, and controlling communication between said first and second bus systems;

a first terminal connected with said first bus system; and a second terminal connected with said second bus system;

wherein when said dummy terminal receives a terminal-identification recognition signal from one of the host computers, said dummy terminal transmits terminal identification information to said one of the host computers via the bus system of said one of the host computers, said terminal identification information representing a terminal connected with the other host computer, said first and second host computers being connected with each other via the emulation of the terminal connected with the other host computer by said dummy terminal.

2. A dummy terminal comprising:

bus interface units connecting a plurality of bus systems, operative to receive and transmit data;

data storage units, each data storage unit holding data transmitted or received from a corresponding bus interface unit; and a communication control unit controlling communication by processing the data stored in each data storage unit, wherein said communication control unit stores an "OK" signal in a first data storage unit when a line check signal is received from the first data storage unit, the first data storage unit being associated with the transmitted line check signal, a first bus interface unit, and a first terminal disposed on a first bus system connected with the first bus interface unit;

obtains terminal identification information from a second terminal disposed via a second data storage unit connected with a second bus interface unit, the second bus interface unit connected with the second terminal via a second bus system, the terminal identification information being obtained when the first data storage unit receives a terminal identification recognition signal from the first bus interface unit via the first bus line and holds the terminal identification recognition signal in the first data storage unit and subsequently stores the terminal identification information in the second data storage unit, and converts the format of the terminal identification information communicated between the data storage units and subsequently transmitted from the first data storage unit through the first bus interface unit to the first bus system.

* * * * *